Figure 4:
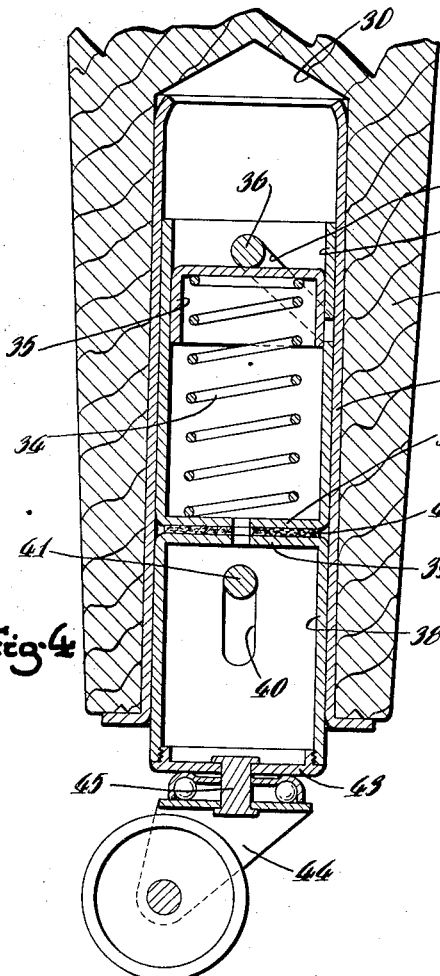

Oct. 17, 1939.    E. R. FROST    2,176,255
ANTITEETERING DEVICE
Filed Nov. 5, 1936    2 Sheets-Sheet 1
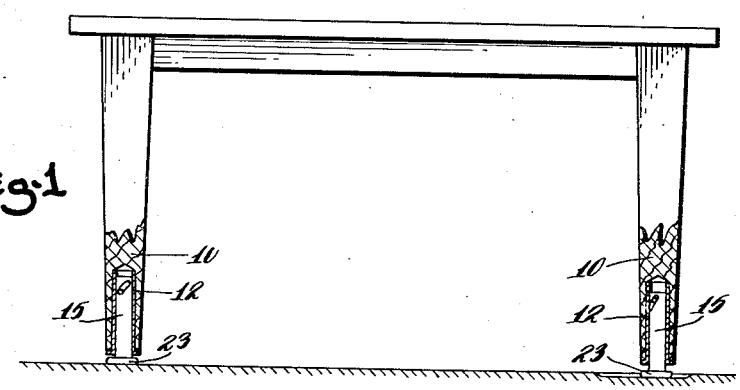
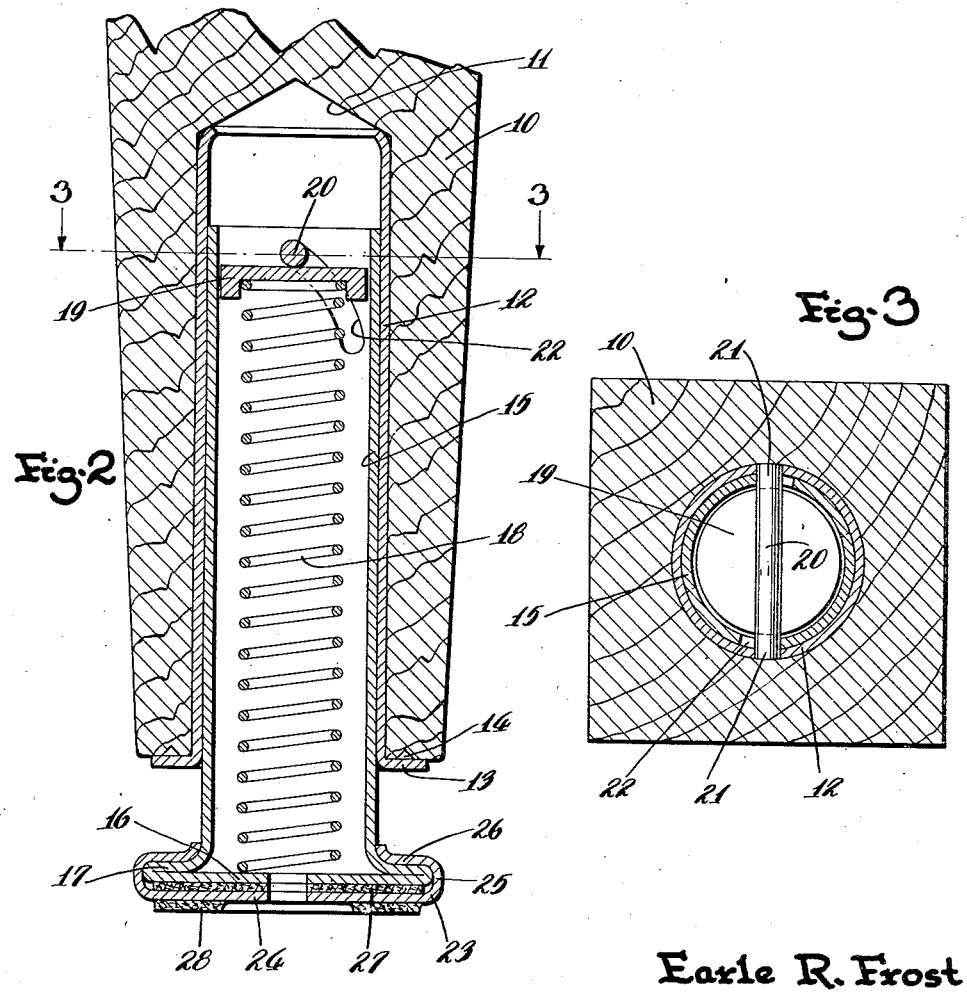
Earle R. Frost
INVENTOR
By Freeman Sweet, Albrecht and Weidman
ATTORNEYS Oct. 17, 1939.  E. R. FROST  2,176,255

ANTITEETERING DEVICE

Filed Nov. 5, 1936  2 Sheets-Sheet 2

Earle R. Frost
INVENTOR

By Freeman, Sweet, Albrecht and Weidman
ATTORNEYS

Patented Oct. 17, 1939

2,176,255

UNITED STATES PATENT OFFICE 2,176,255

ANTITEETERING DEVICE

Earle R. Frost, Shaker Heights, Ohio

Application November 5, 1936, Serial No. 109,294

9 Claims. (Cl. 45—139)

This invention relates to antiteetering devices for tables, desks, and other multi-supported objects, and has for its principal purpose the provision of new and improved devices of this character. More particularly the invention contemplates the provision of antiteetering devices, wherein teetering of a multisupported object is entirely overcome, and the weight more evenly distributed over the various supports thereof, regardless of whether the ends of the supports lie in the same plane, or whether the surface adapted to be contacted is a level surface.

Other and further objects of the invention will appear hereinafter.

Figure 5:
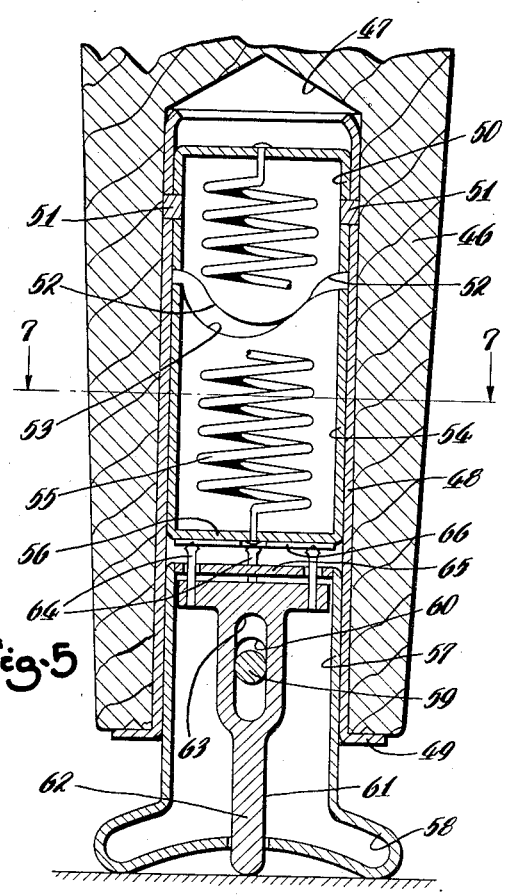
Figure 6:
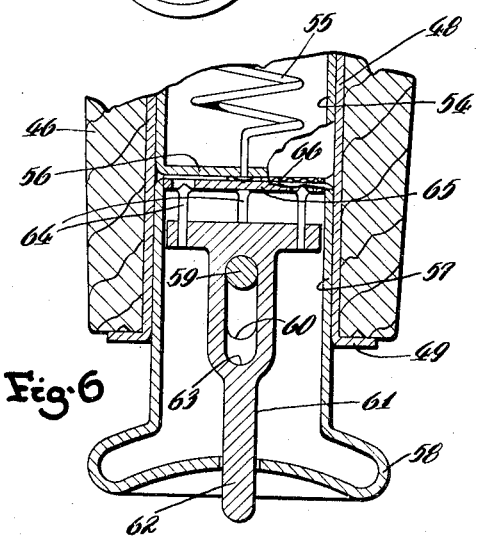
Figure 7:
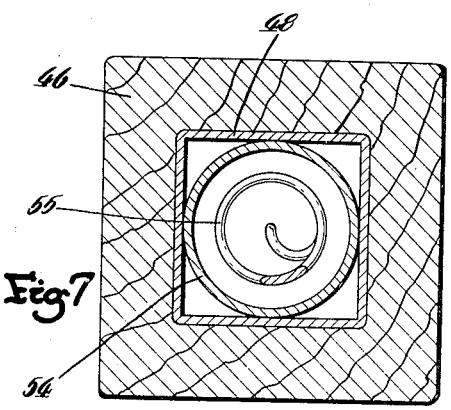

In the drawings accompanying this specification and forming a part of this application, I have shown, for purposes of illustration, embodiments which my invention may assume, and in the drawings:

Figure 1 is a side elevational view of a table, the lower ends of two legs of which are shown in section, with one embodiment of the invention applied to each of said legs, Figure 2 is an enlarged fragmentary vertical sectional view through the lower end of a table leg, showing said embodiment applied thereto, and illustrating the device in a projected position of operation, Figure 3 is a horizontal sectional view, corresponding substantially to the line 3—3 of Figure 2, Figure 4 is a sectional view similar to Figure 2, showing another embodiment of the invention, Figure 5 is a view similar to Figures 2 and 4, showing still another embodiment of the invention, with parts thereof in engagement with a surface to be contacted, Figure 6 is a view similar to Figure 5, showing the parts in projected position, and free of the surface to be contacted, while Figure 7 is a horizontal sectional view, corresponding substantially to the line 7—7 of Figure 5.

Referring first to Figures 1 through 3 of the drawings, one embodiment of the invention is disclosed. In this embodiment, as well as in other embodiments hereinafter described, the antiteetering devices are shown as applied to the legs of a table, but it will be understood that the devices may be applied to desks, refrigerators, and the like, or to any object having a plurality of points of support, wherein difficulty is encountered due to the failure of the ends of the supports to lie in a common plane, or because the surface with which the supports are to contact, is not entirely level.

In carrying out the invention, the antiteetering devices may be applied to two legs of a four-legged table, on the same side thereof; but for the best results I apply one of the devices to each of the four or more legs of the table, or other object to be supported. As best shown in Figure 2, the lower end of a table leg is illustrated at 10, and the end thereof is provided with a socket 11, into which is snugly fitted a tube 12, the lower end of which is flanged as at 13, and provided with upset prongs 14, which may be driven in the under-surface of the table leg 10; if desired, the tube 12 may be held in place by screws or nails, or other securing devices, driven through the flange 13.

Slidably mounted within the tube 12 is a second tube 15, closed at the bottom, as at 16, and formed to provide a folded annular flange 17 at its outer end, a coiled compression spring 18 being disposed within the tube 15, with one end bearing upon the wall 16, and the opposite end accommodated in a cup-like follower 19. The cup-like follower in turn bears against a transversely extending pin 20, the ends 21 of which are fixed in the wall of the outer tube 12.

The pin 20 also extends through oppositely disposed slots 22 formed in the wall of the tube 15. These slots serve to cause rotation of the tube 15 about its longitudinal axis when the tube 15 is pressed inwardly from the position shown in Figure 2. Although the slots 22 are shown as curved in a particular manner, these slots may be straight from end to end, or they may be curved in a direction the reverse of that shown in Figure 2, depending upon conditions to be met. When curved as shown in Figure 2, the cam surface tending to rotate the tube is steepest at the beginning of movement and then decreases; in the reversely curved slot the cam surface initially is less steep and then becomes steeper, this type being more efficient in supporting heavier objects after some travel has taken place; and, of course, when the slot is straight there is no variation at different points of travel.

At the outer end of the tube 15 there is provided an annular foot 23, having a bottom wall 24, a curved vertically extending wall 25, and an inturned flange 26, the latter fitting over the flange 17 of the tube 15, the foot 23 being so mounted as to rotate with respect to the flange 17. To resist this relative rotation, friction generating material 27 is interposed between the bottom wall 16 of the tube 15, and the bottom wall 24 of the foot 23, and to resist rotation of the foot 23 with respect to the surface upon which it rests, the wall 24 of the foot 23 is provided with a layer of friction generating material 28.

As before stated, in actual practice, in the case of a table, for example, it is preferable to apply one of the antiteetering devices to the end of each leg of a four-legged table. When so applied, it makes no difference whether the ends of the legs lie in the same plane, or whether the surface upon which the table is to be placed is level; assuming that three legs of the table are of the same length, and one of the legs somewhat shorter, or disposed in a depression in the surface upon which it rests, as shown in Figure 1, which amounts to the same thing, the weight of the table on the three legs will cause the tubes 15 to be rotated and travel inwardly to the inner ends of the slots 22, transferring a proportional part of the weight to the remaining leg, which will cause the tube 15 of the remaining leg to travel along the slot 22 only so far as necessary to take up its portion of the weight of the table, the strength of the spring 18 and the coefficient of friction between the foot 23 and the flange 17, being predetermined and proportioned to sustain not more than one-quarter of the weight of the table.

After the table has come to rest, abnormal pressure equal to more than one-quarter of the weight of the table must be brought to bear immediately over the short leg in order to disturb the position of its antiteetering device, it being necessary to overcome inertia, compress the spring 18, and overcome the friction between the foot 23 and the flange 17 of the tube 15. Ordinary pressures, therefore, exerted over the short leg, such as leaning the arms on the table, and the like, are not sufficient to cause the device to be again set in motion. Additionally should the short legged corner be accidentally depressed, the table still will not teeter, because the device on the long leg diagonally across from the short leg will be projected a corresponding amount as soon as weight is removed therefrom.

Although in the embodiment described each of the legs of the table has been fitted with one of the devices, it is possible to obtain a satisfactory effect when only two of the four legs on the same side of the table are equipped with the devices; in this case the strength of the spring 18 would be sufficient to return the device to its original position when unusual pressure thereon is removed, since the force of the spring 18 in this case would be augmented by the weight of the table overlying the diagonally disposed long leg not fitted with one of the devices.

Referring now to Figure 4 a somewhat different embodiment is disclosed wherein the table leg is indicated at 29, and provided with a socket 30 as before. A tube 31 similar to the tube 12 is fitted into the socket 30. Slidably and rotatably mounted in the upper portion of the tube 31 is a tube 32 having a bottom wall 33 against which the lower end of a coiled compression spring 34 bears, the opposite end of the spring 34 being accommodated in a cup 35, bearing against a pin 36, the ends of which are fixed in the wall of the outer tube 31. The tube 32 is provided with inclined slots 37 through which the pin 36 extends, and upon longitudinal movement of the tube 32 with reference to the tube 31, rotation of the tube 32 occurs. Mounted in the tube 31 beneath the tube 32 is a second tube 38 having an upper wall 39, and having vertically extending slots 40 through which extends a pin 41, the ends of which are fixed in the wall of the tube 31. Between the wall 33 of the tube 32 and the wall 39 of the tube 38, there is interposed friction generating material of any suitable character, as indicated at 42, so that rotation of the tube 32 is resisted by contact with the friction material 42, bearing upon the wall 39 of the tube 38. The outer end of the tube 38 is provided with a cap 43 having a caster 44 swiveled thereto, as indicated at 45.

This construction operates in identically the same manner as the construction already described, the principal difference residing in the fact that the part 38, which substantially corresponds to the foot 23, is positively held against rotation, so that this part may carry a caster without interfering with the intended operation of the device.

Referring now to Figures 5 through 7, a somewhat different embodiment is disclosed, intended primarily for lighter objects, such as card tables, and the like. In this construction the table leg is indicated at 46, and provided with a socket 47, preferably square in cross-section, and made to accommodate a sleeve 48, also square in cross-section to fit the socket 47, and provided with a flange 49 secured to the lower end of the leg 46. Fixedly mounted in the upper end of the sleeve 48 is a cup-shaped annular member 50, secured against rotation by studs 51, and at its lower edge is provided with cam surfaces 52, cooperable with cam surfaces 53 formed on the upper edge of a sleeve 54 also accommodated within the sleeve 48, a torsion spring 55 having one end connected to the stationary member 50, and the opposite end connected to the wall 56 of the sleeve 54, the spring 55 tending to rotate the sleeve 54 and press the same outwardly through action of the cam surfaces 52 and 53. Mounted below the sleeve 54 is a tubular part 57, the lower end of which is enlarged, as at 58, to engage the surface upon which the object is to rest, and the tubular part 57 is held against rotation by means of a pin 59 extending through slots 60, the ends of the pin 59 being fixed in the wall of the outer sleeve 48. Reciprocably mounted within the tubular member 57 are pawl means 61, the stem 62 of which projects through an opening in the lower wall of the tubular member 57, the pawl means 61 having a slotted portion 63 slidably accommodating the pin 59, and having a plurality of pawl members 64 projecting through a guide plate 65, and adapted to engage a ratchet plate 66 fixedly secured to the under-surface of the wall 56 of the sleeve 54.

In this construction when the table leg 46 is raised from the supporting surface, the pawl means 61 move to the position shown in Figure 6, the torsion spring 55 through the action of the cam surfaces 52 and 53, forcing the tubular member 57 outwardly. When the table leg 46 is lowered, the pawl means 61 are first thrust upwardly to bring the pawl members 64 into contact with the ratchet plate 66, and further movement of the tubular member 57 inwardly, causes rotation of the sleeve 54 through coaction of the cam surfaces 52 and 53, causing the pawl members 64 to ratchet over the ribs of the ratchet plate 66 until the device comes to rest, after which it is extremely difficult for abnormal pressures to cause retrograde action of the pawl means.

This construction is provided for exceptionally light tables, such as folding card tables, and the like, as it is recognized that the weight of such objects is not sufficient to exert enough pressure to both depress a coiled spring and operate against friction as in the other embodiments; therefore the spring 55 is very light, exerting only enough pressure to return the cylinders 54 and 57 to their outermost positions when the weight of the object is removed. Preferably also this construction is attached to but two legs on the same side of a four-legged table.

It will be apparent to those skilled in the art that I have accomplished at least the principal object of my invention; and also that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. An object, intended to be supported from a supporting surface at a plurality of places and comprising a plurality of supporting means for so supporting said object, said supporting means being constructed and arranged to compensate automatically for unevenness in said supporting surface, and thereupon to support the object against teetering; each of said supporting means comprising a compensating device having contact means adapted to engage such surface; each of said contact means being constructed and arranged to be biased outwardly from the corresponding supporting means, and being movable relative to the contact means of the other of said devices, so that said contact means simultaneously contact said surface, and each of said devices having means, in addition to the biasing force, constructed and arranged to operate when the respective contact means engages the supporting surface for resisting inward movement of said contact means.

2. An object, intended to be supported from a supporting surface at a plurality of places, and comprising a plurality of supporting means for so supporting said object, said supporting means being constructed and arranged to compensate automatically for unevenness in said supporting surface, and thereupon to support the object against teetering; each of said supporting means comprising a compensating device having contact means adapted to engage such surface; each of said contact means being movable outwardly from the corresponding supporting means, and being movable relative to the contact means of the other of said devices, so that all of said contact means may simultaneously contact said surface; resilient means, cooperating with each of said contact means, biasing each of said contact means outwardly from the corresponding supporting means; and means carried by each of said devices, constructed and arranged to cooperate with said resilient means to resist inward movement of the respective contact means, and operating when the respective contact means engages the supporting surface.

3. In combination: a supporting foot, having a recess at its lower end; pin means, carried by said foot, and traversing said recess; a tubular body having slot means cooperating with said pin means, said slot means being so constructed and arranged that said body is movable longitudinally of said recess and is simultaneously rotated during longitudinal movement; a member, rotatably secured to said body, and having a surface adapted to frictionally engage a support; resilient means, biasing said tubular body outwardly of said foot recess, and said member being bodily movable with said body during outward movement; said body and said member having friction generating surfaces in juxtaposed relation, constructed and arranged to retard relative rotative movement between said body and said member, when said member frictionally engages the support, thereby retarding movement of said body inwardly of said foot recess.

4. In combination: a supporting foot, having a recess entering inwardly from its end; a body, constructed and arranged to move axially of said recess, and to simultaneously rotate during such axial movement; bearing means, disposed in said recess for axial movement only, and being extensible and retractable with respect to said foot end, said bearing means having a portion adapted to contact a supporting surface, and a portion in juxtaposed relation with a portion of said body; means interposed between said juxtaposed portions, constructed and arranged to permit relative rotational movement between said body and said bearing means, when said bearing means portion is out of contact with the supporting surface, so that said biasing means may act on said body to move said bearing means to extended position, said interposed means retarding relative rotation between said body and said bearing means when said bearing means portion is in contact with the supporting surface, to yieldably hold said bearing means against movement to retracted position.

5. In combination: a supporting foot, having a recess entering inwardly from its end; cam means, fixed in said recess; a movable body, having cam means constructed and arranged to cooperate with said fixed cam means, whereby rotation of said body also causes axial movement of said body, said body having a corrugated surface disposed toward the recess opening; bearing means, disposed in said foot recess for axial movement only, and comprising finger means cooperable with said corrugated surface, said bearing means being extensible and retractable with respect to the end of said foot, and having a portion adapted to engage a supporting surface; and torsion spring means, constructed and arranged to urge rotation of said body in a direction whereby said body is moved axially toward the open end of said recess; said corrugated surface, when said bearing means is out of engagement with the supporting surface, freely riding over said finger means, and said finger means, when said bearing means is in engagement with the supporting surface, engaging said corrugated surface, and opposing rotational movement of said body in an opposite direction, whereby said body is opposed in movement axially and inwardly from the open end of said recess.

6. A device adapted to be attached to a supporting foot, comprising: first means, movable axially of said foot toward and away from a supporting surface, and simultaneously rotatable respectively in one direction or the other during such axial movement; resilient means constructed and arranged to urge said first means axially and rotatably in one direction toward the supporting surface; and second means, interposed between the supporting surface and said first means, constructed and arranged to oppose rotatable movement of said first means when said second means engages the supporting surface, and thus oppose axial movement of said first means.

7. A device adapted to be attached to a supporting foot, and comprising: first means, movable axially of said foot toward and away from a supporting surface, and simultaneously rotatable respectively in one direction or the other during such axial movement; resilient means constructed and arranged to urge said first means axially and rotatably in one direction toward the supporting surface; and second means, interposed between the supporting surface and said first means, and comprising rotation retarding means opposing rotatable movement of said first means when said second means engages the supporting surface, thus opposing axial movement of said first means.

8. A device adapted to be attached to a supporting foot, comprising: contact means, adapted to engage the supporting surface, and constructed and arranged to be biased away from the supporting foot in a direction toward the supporting surface; and means, in addition to the biasing force, constructed and arranged to operate when said contact means engages the supporting surface, for resisting movement of said contact means in a direction away from the supporting surface.

9. A device adapted to be attached to a supporting foot, and comprising: means, movable axially of a foot to which said device is attached and toward and away from a supporting surface, and simultaneously rotatable respectively in one direction or another during such axial movement; and resilient means, constructed and arranged to urge said movable means axially and rotatably in one direction toward the supporting surface; said movable means being yieldably held against rotatable movement when it frictionally engages the supporting surface, thus opposing axial movement of said movable means away from the supporting surface.

EARLE R. FROST.